Feb. 6, 1968
T. A. SAULNIER
3,367,790
METHOD OF MAKING COLOR-KINESCOPES OF THE
LINE-SCREEN SENSING VARIETY
Filed Dec. 1, 1964
3 Sheets-Sheet 1
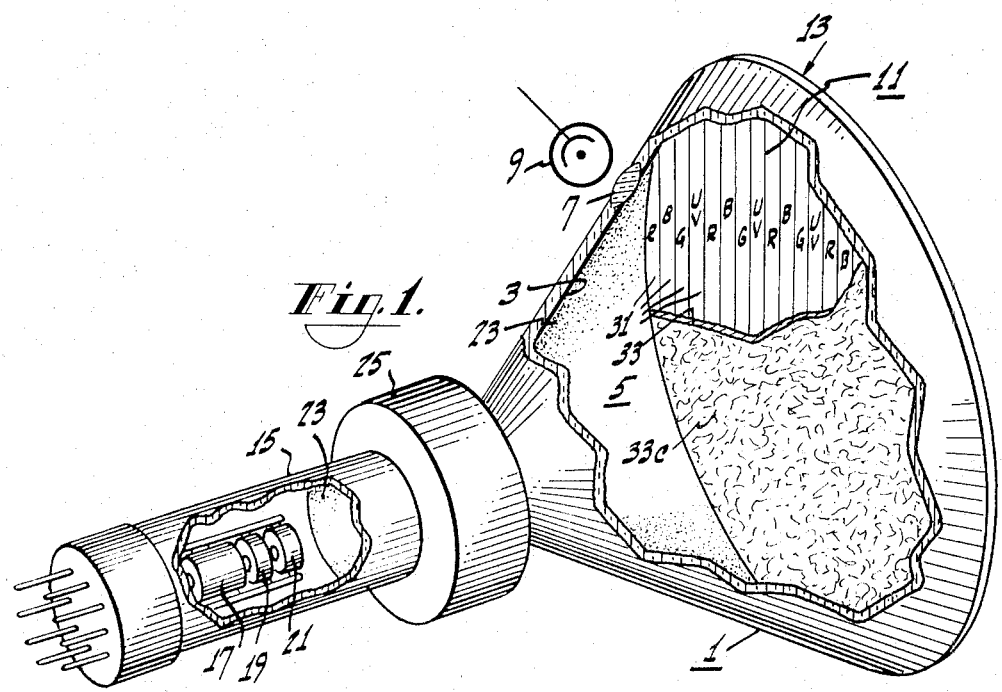
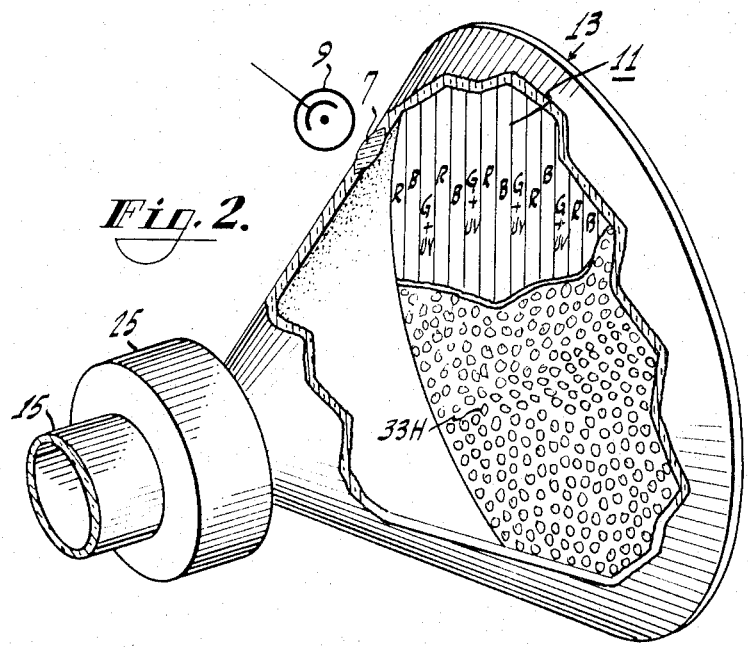
INVENTOR.
THEODORE A. SAULNIER
BY
L. Greenspan
ATTORNEY

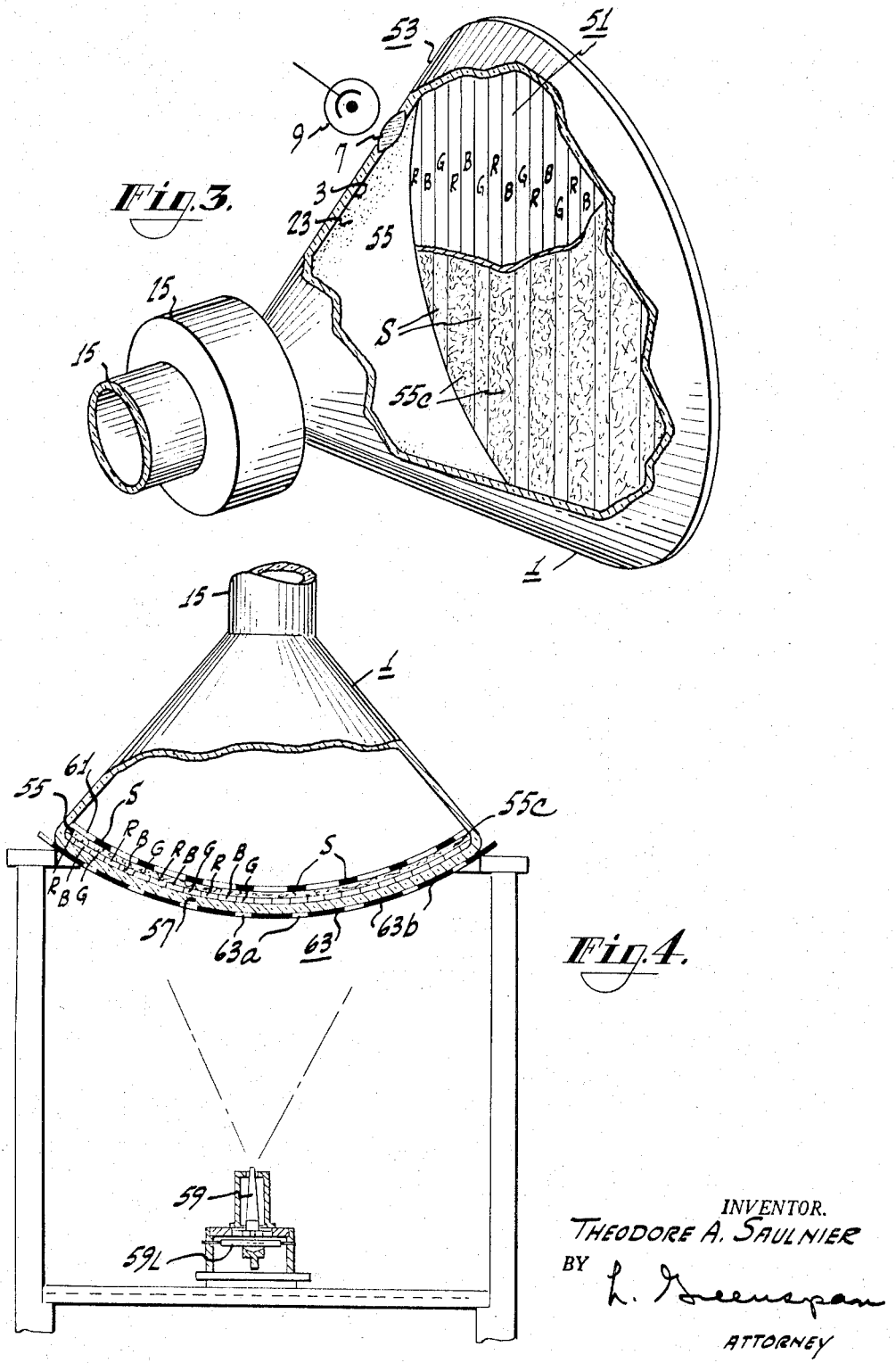

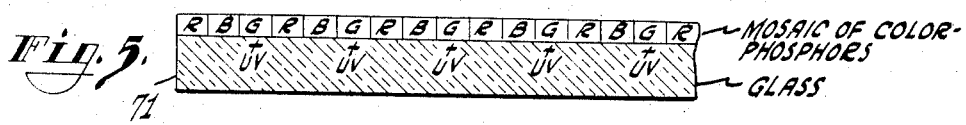
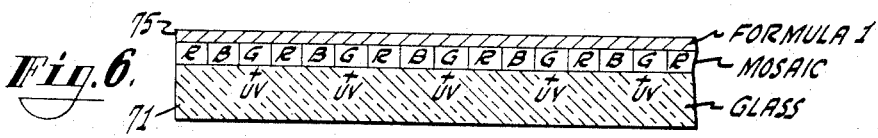
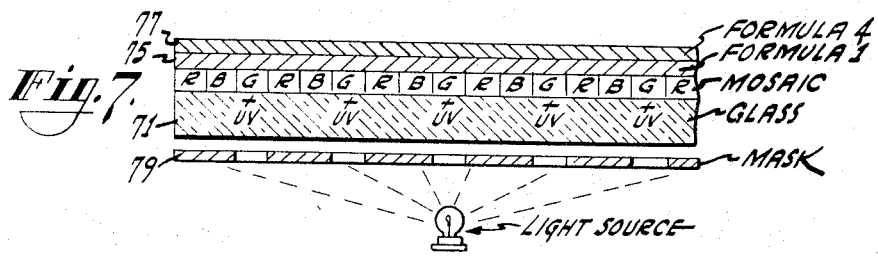
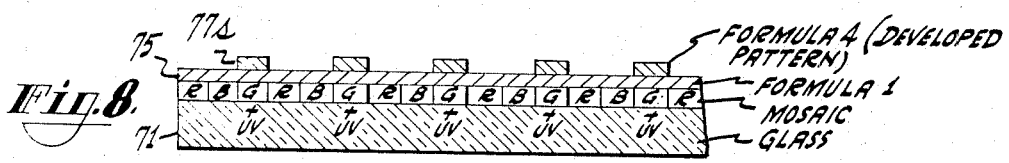
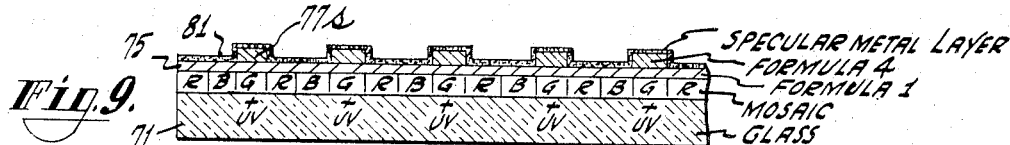
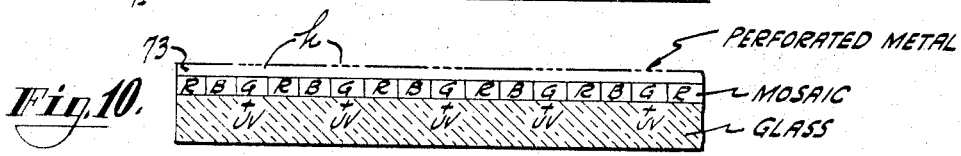

United States Patent Office 3,367,790
Patented Feb. 6, 1968

1

3,367,790
METHOD OF MAKING COLOR-KINESCOPES OF THE LINE-SCREEN SENSING VARIETY
Theodore A. Saulnier, Lancaster, Pa., assignor to Radio Corporation of America, a corporation of Delaware
Continuation-in-part of application Ser. No. 99,520, Mar. 30, 1961. This application Dec. 1, 1964, Ser. No. 414,962
9 Claims. (Cl. 117—33.5)

This is a continuation-in-part of application Ser. No. 99,520 filed Mar. 30, 1961, now Patent No. 3,177,389, by Theodore A. Saulnier.

It has previously beeen proposed to derive reference or control signals from the phosphor screen of a color-kinescope of the line-screen variety and to utilize such signals for controlling the timing of the electron-beam, or for securing linear, vertical or other directional scanning movements of a high order of precision. The control signals in line-screen kinescopes of the sensing variety may be derived from the color-phosphor lines per se (as in Zworykin U.S.P. 2,415,059) or, more commonly, from some added signal-generating substance (e.g., an ultra-violet emitting phosphor). In this latter case such substance may be either (a) mixed with or superimposed upon one or more of the color-emitting phosphors, or (b) it may be contained in discrete strips or lines laid down either (i) between the color-phosphor lines, or (ii) on the target surface of an electron-transparent specular metal layer that covers the rear surface of the light-emitting phosphor mosaic. (As to this, see Law U.S.P. 2,633,547 and Liebscher U.S.P. 2,932,756.)

As is well known, the brightness of an image produced on any television screen is greatly enhanced when the screen is metallized, i.e., when it is provided on its rear surface with a specular metal layer. Metallized phosphor-screens of the above-described sensing varieties, however, have certain disadvantages. These disadvantages result primarily from the fact that, although the usual specular metal layer is transparent to electrons, it is nevertheless substantially opaque not only to (a) the invisible rays emitted by the signal-generating material, but also to (b) the visible or invisible actinic rays employed in the conventional photographic method of laying-down the line-like mosaic pattern or patterns of which the screen is comprised.

Because, as above mentioned, a conventional electron-transparent specular metal layer is opaque to the invisible (e.g., ultra-violet) control or reference signals, if such a layer is laid down on a sensing-type screen of the kind where the signal-generating indicia and the light-generating phosphor lines comprise but a single layer, then the photocell or other "pick-up" device for the control signals must be mounted in front of the screen-plate. This front mounting is undesirable because the reference signals may be contaminated by ambient rays before they reach the pick-up device. Furthermore, the very presence of the pick-up device in front of the kinescope limits the angle from which the screen may be viewed.

Because prior art tubes that contain a sensing screen having more than two layers (see Law 2,633,547) employ a pick-up device mounted at the rear of the screen they are not subject to the above-described disadvantages of sensing tubes that contain a two-layer screen. Multi-layer sensing screens however are more expensive to manufacture than two-layer sensing screens. This is so principally because in multi-layer sensing screens the specular metal layer, which comprises the substrate for the signal-generating strips, is opaque to the actinic rays used in the now standard photographic method of forming said strips on the metal. As a consequence, the bulb that is to contain the finished screen must be made in two precisely matched parts (i.e., "cone" and "cap") to permit the optical stencil and light source to be disposed adjacent to the rear surface of the metal layer during the photographic deposition process.

If the several photographic exposures required in laying down a multi-layer sensing screen could all be made with the appropriate optical stencil and light source disposed adjacent to the obverse surface of the face-plate it would then be practical to employ a "one-piece" envelope or bulb (as in a black-and-white kinescope) and thus to effect economies not only in bulb costs but in the photographic process as well. To this end, it has previously been proposed to make the aluminum layer so thin, and the exposure-time so long, that the actinic rays required in laying down the sensing strips will penetrate the aluminum (or other specular metal) layer. But such obvious expedients are incapable of practical achievement because the reduction in thickness of the aluminum layer required to make it permeable to radiation of an intensity useful in the photo-deposition process reduces the electrical conductivity and reflectivity of the specular metal to unusable values.

The foregoing and other less apparent disadvantages of present day two-layer and three-layer sensing-screens are obviated, in accordance with the present invention, by the combination with any suitable transparent or translucent phosphor substrate, of a specular metal layer of a thickness normally rendering it substantially opaque to (a) the invisible rays from which the control signals are derived and (b) the visible or invisible actinic rays employed in the screen-plotting operation, yet transparent to electrons, and containing openings in a number and of a size sufficient to render said metal layer or certain parts thereof at least 10% transparent (and in some cases as high as 25%) to such visible and invisible rays. The invention may be said further to reside in the later described methods of achieving specular metal layers of a foraminous (crazed or perforate) nature.

The invention is described in greater detail in connection with the accompanying three sheets of drawings wherein:

FIGURE 1 is a partly broken-away view in perspective of a color-kinescope of the two-layer line-screen sensing variety wherein the phosphor substrate is provided with a crazed specular metal layer through which sensing signals from the substrate pass in their transit to a signal pick-up area at the rear of said screen;

FIGURE 2 is a view similar to FIGURE 1 but showing a two-layer sensing screen wherein the sensing substance is mixed with one of the color-phosphors, and the specular metal layer is rendered permeable to sensing signals by a multiplicity of minute holes (instead of thread-like cracks);

FIGURE 3 is a partly broken-away view in perspective of a color-kinescope of the three-layer line-screen sensing variety wherein the signal-generating indicia are laid down on the rear of a crazed specular metal layer;

FIGURE 4 is an elevational view, partly in section, of a photo-exposure apparatus or "lighthouse" having a one-piece kinescope bulb set-up thereon during the final stage in the photographic deposition of the kinescope's 3-layer screen; and FIGURES 5 to 10, inclusive, are transverse sectional views showing successive steps in the manufacture of a 3-layer color-phosphor sensing-screen having a specular metal layer which is opaque to actinic rays and to sensing signals in all areas of the metal except those which lie in register with the areas of origin of said signals.

FIGURE 1 shows a one-piece evacuated all glass envelope 1 of the form and dimensions common in the black-and-white television tube art, but which has been modified by the inclusion, in a wall 3 of its main chamber 5, of a hermetically sealed port, window or lens 7. Ultra-violet light passes through this transparent part 7 of the tube 1 to a phototube 9 from an electron-sensitive sensing screen 11 on the inner surface of the face-plate 13 of the tube 1. The neck-portion 15 of the tube 1 contains the conventional cathode 17, grid 19, and anode 21 elements of an electron-gun. Other conventional features of the tube of FIGURE 1 are (i) a second anode in the form of a conductive coating 23 on the inner surface of its main chamber 5 and neck 15 and (ii) a magnetic yoke 25 on the neck of the tube, for imparting the requisite screen-scanning movements to the single electron-beam, not shown.

The sensing type two-layer screen 11 of FIGURE 1 comprises a substrate in the form of a line-like phosphor mosaic 31 and a specular metal layer 33 on the rear or target surface of the phosphor substrate. The mosaic substrate 31 here shown is made up of a multiplicity of groups of four vertically extending parallel phosphor lines. Three of the lines of each group are made up of phosphors having respectively different color-response characteristics, e.g., red (R), blue (B) and green (G) and the fourth line of each group is an ultra-violet (U.V.) signal-emitting phosphor (e.g., zinc oxide, or calcium magnesium silicate) having a rapid light-decay characteristic. Alternatively, the signal-generating indicia may comprise a serving of ultra-violet phosphor particles mixed with one of the color-phosphors, (R, B, or G) of each group, as is indicated by the legend $G+UV$ on the screen shown in FIGURE 2.

The aluminum (or other specular metal) layer 33 on the rear surface of the phosphor mosaic 31 is of a special construction which permits the ultra-violet rays from the signal-generating substance (U.V.) to pass therethrough to the signal pick-up area 7 at the rear of the screen, and thus to be "sensed" by the phototube 9. This desirable light-permeable property of the specular metal layer 33 is achieved, in accordance with the invention, without any substantial sacrifice in its electrical continuity, or in its specular properties, by crazing the metal, as is indicated by the great multiplicity of randomly arranged thread-like cracks 33c in the screen of FIGURE 1. Substantially the same results are provided by a similar number and distribution of minute holes 33H of generally circular contour in the aluminum layer of the screen shown in FIGURE 2.

Various ways of making the light-permeable specular metal layers shown in FIGURES 1 and 2 are described later on in this specification. However, it may be well first to refer to FIGURES 3 and 4 for an understanding of an important advantage of using such a light-permeable layer as a substrate for the signal-generating indicia of a *multi*-layer sensing-screen. This important advantage resides in the fact that it is now practical to lay down such a *multi*-layer sensing-screen in a one-piece bulb by the photographic method heretofore employed in laying down a single-layer phosphor mosaic on the screen-plate of present-day line-screen and dot-screen tubes of various non-sensing varieties.

The multi-layer, line-screen, sensing screen 51 shown in the one-piece bulb 53 of FIGURE 3 is similar to the sensing screen of the Law Patent (2,633,547) in that the sensing strips S are laid down on the rear surface of the specular metal layer 55 each in register with one of the color-phosphor lines (in this case the green-phosphor line G) of the line-like phosphor mosaic R, B, G.

In FIGURE 4, the one-piece bulb 53 is set up with the obverse surface of its face-plate 57 exposed to a point source of light 59. As here shown, the kinescope is at that stage of its manufacture whereat a substantially transparent line-like mosaic of red (R), blue (B), and green (G) phosphor lines has already been laid down on the inner surface of the face-plate and provided on its target surface (in a manner later described) with a crazed specular metal layer 55. The thickness (say 500 A. to 5,000 A.) of this specular metal (aluminum) layer 55 is such that in the absence of crazing it would be transparent to electrons yet substantially opaque to the visible and/or invisible actinic rays used in the photographic deposition of the phosphor substrate (R, B, G). The crazing, however, provides the metal with a multiplicity of minute thread-like areas 55c of lesser thickness which are permeable to the rays from the light source 59. The permeability of these areas or "cracks" to such rays permits the signal-generating strips S (FIGURE 3) to be laid down photographically on the back of the aluminum layer by a method similar to that employed in laying down the phosphor mosaic R, B, G. This is achieved by coating the rear surface of the crazed aluminum layer 55 with a film 61 composed of photosensitized gel (e.g., polyvinyl alcohol, polyvinyl pyrrolidone, or fish glue) containing ultra-violet phosphor particles and by exposing said layer 61 to radiation from the light source 59 through an optical stencil 63 disposed on or adjacent to the obverse surface of the tube's face-plate 57. The optical stencil 63 may be either curved or flat, and is preferably the same, or a duplicate of, the stencil previously employed in photographically laying down the color-phosphor mosaic.

It is so positioned with respect to the movable light source 59 that its transparent areas 63a lie in register with one of the phosphor lines (say, the green phosphor line G) of each triad (RBG) and its opaque areas 63b cover the other two lines of each triad. (The contour of the stencil 63, the contour and dimensions of its line-like openings 63a, and its relative position with respect to the light-source and screen-surface should, of course, be chosen with a careful regard to the particular curved line or straight line mosaic-pattern desired in the finished screen.) Since, as previously mentioned, the phosphor mosaic RBG, the crazed aluminum layer 55 and the specified areas 63a of the optical stencil 63 are permeable to rays from the source 59, the photosensitized coating 61 will become hardened in those line-like areas which are exposed to said rays. The unexposed and hence unhardened areas of the coating are then washed away with water. Thereafter the hardened gel in the remaining phosphor-containing line-like signal-generating areas S are removed by vaporization when the tube is "baked-out."

Ordinarily, the primary source of light employed in the screen-plotting operation is an ultra-violet lamp (59L, FIGURE 4) such as General Electric Co. one kilowatt high pressure mercury arc lamp (Type BH6). The objects of the invention are achieved by the provision of an "apertured" (crazed as in FIGURES 1 and 3, or perforated as in FIGURE 2) specular metal layer which will transmit at least 10% of the visible and invisible "light" rays from such a lamp. Certain preferred ways of making such "apertured" specular metal layers are described below.

METHOD OF CRAZING

One way of achieving a crazed specular metal layer is to evaporate the aluminum or other specular metal onto a previously crazed volatilizable substrate so that, upon volatilizing the substrate, the metal will assume the crazed pattern of the substrate before it was volatilized. In contemplating such a procedure, it might at first glance appear that the vaporized metal would fill up the cracks in the substrate but such is not the case, apparently, for two reasons: (i) the randomly oriented cracks in the substrate are much deeper than they are wide, and (ii) the individual particles of vaporized metal do not "settle" onto and then flow over the substrate but approach it at an angle with respect to the vertical, and stick where they land.

The "filming" materials employed in making a crazed volatilizable substrate are preferably non-flammable resin-water dispersions or emulsions. Thus, the substrate for the specular metal may be deposited on the phosphor-mosaic from a water-based emulsion of a copolymer of an alkyl methacrylate and/or an alkyl acrylate and methacrylic acid and/or acrylic acid. The substrate may be, for example, a copolymer of ethyl methacrylate and methacrylic acid. Alternatively, the substrate may be of a copolymer of one or more of methyl methacrylate, ethyl acrylate, butyl methacrylate, and propyl methacrylate in combination with one or more of methacrylic acid and acrylic acid. Having regard to the desirability of salvaging imperfectly filmed screens and glass tube parts, it is preferable to employ a polymer in which some of the ester groups of the polymer chain are replaced by acid groups, so that the film may be removed by redispersion with a solution of mild alkali, such as ammonium hydroxide, tetra sodium pyrophosphate, tri sodium phosphate, morpholine, or the like.

The amount of heat applied in drying the emulsion and the percentage of plasticizer used, control the crazing and profile of the film. The general rule is that the formula of the emulsion, and its method of application, must be such that the emulsion coating can be dried to its solid state at a temperature *lower* than its minimum film-forming temperature. The coarseness of the crazing is affected by film thickness; thick films giving the coarser (i.e., fewer but wider cracks) crazing. Coating thickness is in turn affected by the rate of water imbibition of the substrate and the resin solids content of the coating dispersion.

Excellent results have been achieved with a resin emulsion comprising a copolymer of ethyl acrylate, methyl methacrylate, and methacrylic acid dispersed in water with the aid in making up the emulsion of a small amount (say, 0.75% to, say, 4% based on the weight of resin solids) of one or more dispersing agents such, for example, as (i) a vinyl phenol glycol ether ("Tergitol NPX"), (ii) a sodium salt of alkylaryl polyether sulfonate ("Triton X-200"), (iii) sodium dioctyl sulfosuccinate ("Aerson OT"), or (iv) sodium lauryl sulfate. The formulation, in one case, was:

*Formula 1*

Resin solids: 10% ±0.5%
Water to make 100%

In this formula, a plasticizer was not used because maximum crazing was desired for the resin being used. The adherence of the crazed resin to the substrate may be enhanced by reducing the film hardness (and hence some of the crazing) with a plasticizer, such as dibutyl pthalate, butyl pthalate, butyl glucolate, methyl pthalate, ethyl glycolate.

The water based emulsion substrate may be applied to either a wet or dry phosphor screen in any of several ways, e.g., (i) "spray," (ii) "hosing," or (iii) "slurry, slosh and swirl." In the instance of applying a thin film over a phosphor screen, it is usually advantageous to apply a spinning motion to the phosphor screen during and after application of the emulsion in order to remove excess emulsion and level the emulsion. The speed of rotation can be varied between 30-90 r.p.m. to adjust the rate of emulsion draining to agree with the coating thickness desired, rate of drying and emulsion solids concentration applied.

Dry tri-color screens have been coated satisfactorily with resin emulsion dispersions having a resin content of 7.5 to 11%. Wet phosphor screens require slightly higher solids as do non-imbibing substrates. Less solids can be applied with some sacrifice in gloss. Wet phosphor screens are wet to the extent that the polyvinyl alcohol binder for the phosphor is fully swelled with water, but excess surface water is nearly all drained off by spinning. The lower the water content of the screen, the less the emulsion will be diluted. Accordingly, when coating wet phosphor screens, the resin solids should be adjusted, usually between 10 and 15% resin solids, to agree with the water drainage provided by the coating system being used. In the following example, the "slurry, slosh and swirl" technique may be employed in applying the emulsion to a previously dried tri-color mosaic screen made up of contiguous phosphor lines arranged in a repetitive pattern on the face-plate of a one-piece bulb.

In the instant case the preferred procedure is as follows:

(1) Place the previously screened color-kinescope bulb, open-end up, upon an automatic slurry spinner, the bulb being at room temperature (20-22° C.). The "slurry spinner" may be similar to the one shown by Weingarten et al. in U.S.P. 2,902,973 since the non-flammable nature of the emulsion or "slurry" permits the invention to be carried out on a factory conveyor system.

(2) Start slow rotation and slow tilting of the bulb.

(3) Apply a serving of 45-80 milliliters of emulsion quickly to the center of the screen area without causing foam.

(4) Rotate the bulb to spiral the emulsion puddle over the screen area.

(5) Tilt the bulb quickly to dump most of the excess slurry. At this point the plane of the screen is tilted slightly (15-20°) beyond the vertical.

(6) Increase the speed of rotation to 60-70 r.p.m.

(7) Apply a stream of warm air to the emulsion coated screen of the spinning bulb, the heat being regulated to keep the emulsion well below (say, 5°-10° below) its minimum film-forming temperature which, in this case, is 41° C.

(8) Continue the warm air for about two minutes. The emulsion coating, thus heated, being permitted to dry at room temperature (22°-25° C.) to its desired solid crazed state.

(9) A jet of water may be used to rinse the excess emulsion off the sidewalls of the bulb during the drying cycle.

(10) Next, apply a specular metal layer of the required thickness to the crazed emulsion coating, e.g., by thermal evaporation of aluminum, in vacuo.

(11) Finally, bake out the tube to volatilize and remove the organic substrate materials.

The exact amount of plasticizer may be varied over a wide range (0% to 10%, based on the resin solids) in order to achieve the desired crazed characteristics. For example, no plasticizer at all need be employed if emulsion adherence to the substrate is adequate and *maximum* crazing is desired. The emulsion and substrate should ordinarily be in the 30° C. to 36° C. temperature range (i.e., well below the minimum film forming temperature of 41° C.), at the moment the water in the emulsion is reduced to the point where the crazed film just starts to form.

Materials suitable for use in carrying the invention into effect are commercially available, in various degrees of hardness, for Rohm and Haas Co. under its trade designation Rhoplex (B-85, B-74, C-72, D-70 and B-15). When purchased in this form it is possible to mix two or more of the resins to provide water based emulsions having different minimum film-forming temperatures, as desired.

In some cases where maximum crazing is used, the phosphors may not provide an adequate substrate for the crazed metal. That is to say, if the phosphor layer is very thin or particularly porous, the evaporated aluminum may penetrate through the cracks of the crazed plastic film to the interior of the phosphor layer. This condition is undesirable because the aluminum can surround some phosphor particles cutting their emission to such an extent that the screen efficiency is reduced to an undesirable level of light output.

In the above cases (as in the embodiment of the invention later described in connection with FIGURES 5-10) an intermediate layer of a softer resin with a low film-forming temperature can be applied or a hard resin may be plasticized to a low film-forming temperature. It is also desirable to have this seal coat hydrophilic because the final layer of crazed emulsion must be applied over this dried layer. Accordingly, a hydrophilic film forming composition (see Formula 2) may be substituted for all or part of the plasticizer with hard resins. With soft resins the hydrophilic polymer would merely serve to enhance rapid wetting by the resin emulsion suspension used for the crazed layer.

A suitable composition for the intermediate hydrophilic (but not easily water soluble) film is a polyvinyl acetate resin emulsion with polyvinyl alcohol or hydroxyethyl cellulose. Alternately, any of the emulsion used for crazed coatings can be combined with a suitable amount of a water soluble film former.

Material of the following composition has been applied successfully to meet the varying needs of special screen conditions:

*Formula 2*

| | Percent |
|---|---|
| Polyvinyl acetate emulsion | 8–10 |
| Polyvinyl alcohol based on the polyvinyl acetate solids | 1–2 |

Water to make 100%.

The amount of polyvinyl acetate in this formula depends upon the amount of film to be applied. The amount of polyvinyl alcohol employed is governed by the need for improved hydrophilic properties in the dried film and the film forming properties of the emulsion resin used.

METHOD OF PERFORATING

As set forth in the sixth paragraph of this disclosure the objects of the invention can be achieved either by (i) "crazing" or (ii) "perforating" the specular metal. Suitable crazing methods having been described, reference will now be made to ways of achieving a satisfactory perforate specular metal layer. It may be well however first to recall that the specular metal layer on the phosphor screens of the prior art contain a number of holes for venting gaseous products released during "bake-out," but that the size and number of such holes and the manner in which they are formed do not permit the transmission therethrough of useful quantities of either actinic radiation (used in the photodeposition process) or of the sensing signals required in the operation of the tube.

Actual measurements of light transmitted through conventional prior art specular-metal layers, when stripped from their phosphor substrates, are of the order of 3% or less. Useful quantities of such radiations (i.e., 10–15% or more) are transmitted by the semi-transparent specular metal layers made by the methods herein described.

Reference will first be made to a method of making a perforate specular metal layer for a mosaic wherein the signal generating substance (an ultra-violet emitting phosphor) lies beneath the specular metal (33H), as it does in FIGURE 2, for example. The first step is to cover the mosaic with a film-forming material comprising a binder (e.g., polyvinyl alcohol, methylcellulose or carboxymethyl cellulose) in which is dispersed fine particles of a material which is insoluble in water and which will at least partly volatilize at a temperature lower than the binder material. The dispersed particles are preferably but not necessarily resinous materials such, for example, as polyvinyl acetate, methyl methacrylate, ethyl methacrylate or even fine particles of nitrocellulose. One suitable filming formula is:

*Formula 3*

| | Percent |
|---|---|
| Polyvinyl alcohol solids | 4–8 |
| Polyvinyl acetate resin particles | 15–22 |

Remainder: Water to make 100%.

When the film has been dried, an imperforate specular metal layer is deposited thereon in the usual way, i.e., by thermal evaporation. Thereafter, the laminate is baked out, as by subjecting it to heat (say, 400°–425° C. for a period sufficiently long (say, 30 minutes) to volatilize all of the organic material therein. It appears that the resin solids (in this case the polyvinyl acetate resin particles) decompose first to blow a very large number of small holes (33H, FIGURE 2) in the metal. Thereafter, the other organic matter, i.e., the polyvinyl alcohol, volatilizes and its gas escapes through said holes and, possibly, through other much smaller holes (not shown) which do not noticeably affect the specular or electrical properties of the rest of the aluminum.

In order to minimize any loss in the overall properties of such a semi-transparent metal layer, the perforations in the metal may be confined to those areas of the metal which lie in register with the areas of origin of the sensing signals. A method of doing this is described below in connection with FIGURES 5 to 10.

In FIGURES 5–10, 71 designates a glass screen-plate upon which a light-transparent, line-like mosaic of red (R), blue (B) and green (G) color-phosphors has been laid down, photographically, by exposure through the glass. In this case, as in FIGURE 2, each green phosphor line G will be understood to contain particles of a signal-generating substance such, for example, as cerium activated calcium-magnesium silicate or other ultra-violet (UV) phosphor having a rapid light-decay characteristic. As above mentioned, the problem here is to provide this mosaic of color-phosphors with a continuous specular metal layer (73 of FIGURE 10) which is at least 10% permeable to emanations from the sensing substance, and to actinic rays, only in the areas of the metal which lie in register with those (green) areas (G) of the screen that contain such substance. To this end, referring now to FIGURE 6, the mosaic is first provided with a light-transparent film 75 constituted of a volatilizable material which is not resoluble in pure water or by subsequently applied coating materials. One formula for such material is Formula 1 dried *at* or *above* (instead of below) its film-forming temperature. This first film, after being dried in this manner, is coated with a second transparent film 77 (FIGURE 7) made up, for example, of:

*Formula 4*

| | Percent |
|---|---|
| Polyvinyl acetate resin emulsion solids | 15–22 |
| Polyvinyl alcohol solids | 4–8 |
| Ammonium dichromate solids based on the weight of the P.V.A. solids | 3–10 |

Remainder: Water to make 100%.

This second film 77 (Formula 4) is redispersible, except where exposed to actinic light. After this second film has been dried, the laminate is exposed to actinic rays (not shown, but see FIGURE 4) through an optical stencil or "mask" 79 disposed adjacent to the obverse surface of the glass, the transparent areas of the stencil being arranged in register with the phosphor lines (G) which contain the signal-generating substance. Upon developing the resulting photograph, by washing in distilled water, the unexposed areas of the second film 77 (Formula 4) are washed away and light-hardened strips 77s remain on the intact intermediate film 75, (i.e., Formula 1 dried at or above its film-forming temperature) as shown in FIGURE 8. Next, as shown in FIGURE 9, the rear surface of the laminate is provided with an imperforate specular metal (e.g., aluminum) layer 81 of the usual thickness as by evaporation of a pellet of the metal, in vacuo. Thereafter, the laminate is baked out, as by subjecting it to heat (say, 400°–425° C.) for a period sufficiently long (say, 30 minutes) to volatilize all of the organic matter in the laminate. Herein, as in the case of the laminate of FIGURE 2 (Formula 3), the polyvinyl acetate dispersed in the polyvinyl alcohol decomposes first to blow a very large number of small holes h in the "sensing" areas above the green phosphor lines G. Thereafter, the other organic matter, including the matter in layers 75 and 77, volatilizes and the gases escape through the holes H and possibly through other much smaller holes (not shown) which do not affect the specular properties of the rest of the aluminum. As shown in FIGURE 10, the volatilizable material having been removed, the specular metal settles on the phosphor mosaic and adheres to it.

What is claimed is:

1. A method of providing the target surface of a phosphor screen with a partially-transparent specular metal layer, said method comprising
   (1) coating said target surface with a volatizable material which is solid at room temperature and which, if baked for about 30 minutes at about 425° C., is completely volatilized,
   (2) vapor depositing onto said coating a metal layer of a desired thickness which normally renders said metal layer substantially opaque to visible light,
   (3) producing a multiplicity of openings through said metal layer, said openings rendering said metal layer at least 10% transparent to visible light, and
   (4) volatilizing said volatilizable material.

2. A method of providing the target surface of a phosphor screen with a specular metal layer which is about 10 to 25% transparent to light in the visible and ultraviolet regions of the spectrum comprising
   (1) coating said target surface with a volatilizable material which is solid at room temperature and which, if baked for about 30 minutes at about 425° C., is completely volatilized, and which consists essentially of a copolymer including at least one of alkyl methacrylate, and alkyl acrylate and at least one of methylacrylic acid and acrylic acid,
   (2) evaporating onto said coating a metal layer of a thickness normally rendering said metal layer substantially opaque to incident light in the visible and ultraviolet regions of the spectrum,
   (3) producing through said metal layer a multiplicity of randomly-distributed openings of dimensions and numbers sufficient to render said metal layer between about 10 and 25% transparent to light in the visible and ultraviolet regions of the spectrum, and
   (4) volatilizing said coating material.

3. A method of providing the target surface of a phosphor screen with a crazed metal layer, said method comprising
   (1) coating said target surface with a volatilizable material having a certain minimum film-forming temperature and which is solid at room temperature and which, if baked for about 30 minutes at about 425° C., is completely volatilized,
   (2) drying said coating to its solid state at a temperature lower than said minimum film-forming temperature whereby to provide said target surface with a crazed substrate for said metal, the openings due to said crazing constituting at least 10% of the surface of said coating,
   (3) vapor depositing onto said crazed substrate sufficient metal to form a metal layer of the desired thickness thereon which normally renders said metal layer substantially opaque to visible light and thereafter,
   (4) volatilizing said volatilizable material.

4. A method of providing the target surface of a phosphor screen with a crazed metal layer, said method comprising
   (1) coating said target surface with an organic volatilizable material having a certain minimum film-forming temperature and which is solid at room temperature and which, if baked for about 30 minutes at about 425° C., is completely volatilized and consists essentially of a copolymer including at least one of alkyl methacrylate, and alkyl acrylate, and at least one of methacrylic acid and acrylic acid,
   (2) drying said coating to its solid state at a temperature lower than said minimum film-forming temperature whereby to provide said target surface with a crazed substrate for said metal, the openings due to said crazing constituting at least 10% of the surface of said coating,
   (3) evaporating onto said crazed substrate sufficient metal to form a metal layer of the desired thickness thereon which normally renders said metal layer substantially opaque to visible light and thereafter
   (4) volatilizing the organic material of which said crazed substrate is comprised to cause said metal layer to settle directly upon said target surface in the crazed pattern of said substrate.

5. Method of making a color-phosphor screen of that sensing variety wherein a line-like mosaic of color-phosphors is provided with an electron-transparent specular metal layer and with signal-generating indicia disposed on the target surface of said metal layer in predetermined relationship with the color-phosphor lines of which said mosaic is comprised, said method comprising: coating said target surface with an organic material having a certain minimum film-forming temperature and which is solid at room temperature and which, if baked for about 30 minutes at about 425° C., is completely volatilized, drying said coating at a temperature lower than said film-forming temperature whereby to provide said target surface with a crazed substrate for said metal, the openings due to said crazing constituting at least 10% of the surface of said coating, evaporating onto said crazed substrate sufficient specular metal to form a metal layer of the desired thickness thereon, which normally renders said metal layer substantially opaque to visible light, volatilizing the organic material of which said crazed substrate is comprised to cause said metal layer to settle directly upon said target surface in the crazed pattern of said substrate, coating said metal layer with a film of photosensitized polymer containing an electron-sensitive signal-generating substance, exposing only those areas of said photosensitized film which are to contain said signal-generating indicia to actinic rays, and washing said exposed photosensitized film in water to remove the unexposed areas of said film from said metal layer.

6. The invention as set forth in claim 5 wherein said actinic rays are transmitted to said photosensitized film through said crazed layer.

7. Method of providing the target surface of a phosphor screen with a perforate metal layer, said method comprising
   (1) coating said target surface with a volatilizable material which is solid at room temperature and which, if baked for about 30 minutes at about 425° C., is completely volatilized and containing dispersed particles which volatilize at temperatures lower than those of said material,
   (2) vapor depositing a metal layer to a thickness which normally renders said metal layer substantially opaque to visible light onto said coating and then
   (3) heating said coating successively to said temperatures whereby first to volatilize the dispersed particles in said coating to blow holes in said metal layer, said openings rendering said metal layer at least 10% transparent to visible light, and second to volatilize the material in which said particles were contained.

8. Method of providing the target surface of a phosphor screen with a perforate metal layer, said method comprising
   (1) coating said target surface with a volatilizable material which is solid at room temperature and which, if baked for about 425° C., is completely volatilized and which consists essentially of a copolymer including at least one of alkyl methacrylate and alkyl acrylate and at least one of methylacrylic acid and acrylic acid containing dispersed organic particles which volatilize at temperatures lower than that of said polymer,
   (2) evaporating a metal layer to a thickness which normally renders said metal layer substantially opaque to visible light onto said coating and then (3) heating said coating successively to said temperatures whereby first to rapidly volatilize the dispersed organic particles in said coating, and thus to blow holes in said metal layer, said openings rendering said metal layer at least 10% transparent to visible light, and second to volatilize the copolymer in which said particles were contained.

9. In the art of manufacturing a color-kinescope of that line-screen sensing variety wherein certain of the elemental areas of its line-like color-phosphor mosaic-screen contain a substance which emits signal-bearing rays in response to the impact of electrons thereon and wherein a portion of the bulb of the kinescope at the rear of the screen comprises a pick-up region for signals transmitted thereto through openings provided for that purpose in a specular metal layer on the target surface of said mosaic; a method of providing the target surface of said mosaic with a foraminous specular metal layer of the kind wherein the foramina are confined substantially to those areas of the specular metal which lie in register with said certain elemental areas of origin of said signal-bearing rays, said method comprising: coating said target surface with a volatilizable organic material which is solid at room temperature and which, if baked for about 30 minutes at about 425° C., is completely volatilized and which is not resoluble in water, drying said organic material to convert said coating into a substantially imperforate dry film, coating said dry film with a photosensitized organic polymer containing dispersed particles of a resin which decomposes at a temperature lower than that of the decomposition temperature of said polymer, drying said photosensitized polymer to its solid state, exposing only those areas of said photosensitized film which lie in register with said certain elemental areas of said mosaic to actinic rays, washing said exposed photosensitized film in water to remove the unexposed areas thereof from the underlying first-mentioned film, evaporating a specular metal to a thickness which normally renders said metal layer substantially opaque to visible light onto the resulting laminate and thereafter heating said laminate to volatilize the dispersed organic resin particles therein whereby to perforate said specular metal in those areas that lie in register with said certain elemental areas of said mosaic, the perforation rendering said metal layer at least 10% transparent to visible light.

References Cited

UNITED STATES PATENTS

| 2,903,377 | 9/1959 | Saulnier | 117—33.5 |
| 2,960,416 | 11/1960 | Reed | 117—33.5 |
| 3,003,873 | 10/1961 | Zworykin | 117—33.5 |

FOREIGN PATENTS 234,457 10/1959 Australia.

ALFRED L. LEAVITT, *Primary Examiner.*

A. H. ROSENSTEIN, *Assistant Examiner.*